May 21, 1968          L. R. SUCHY          3,383,927
POWER TAKEOFF SHAFT
Filed Dec. 15, 1966
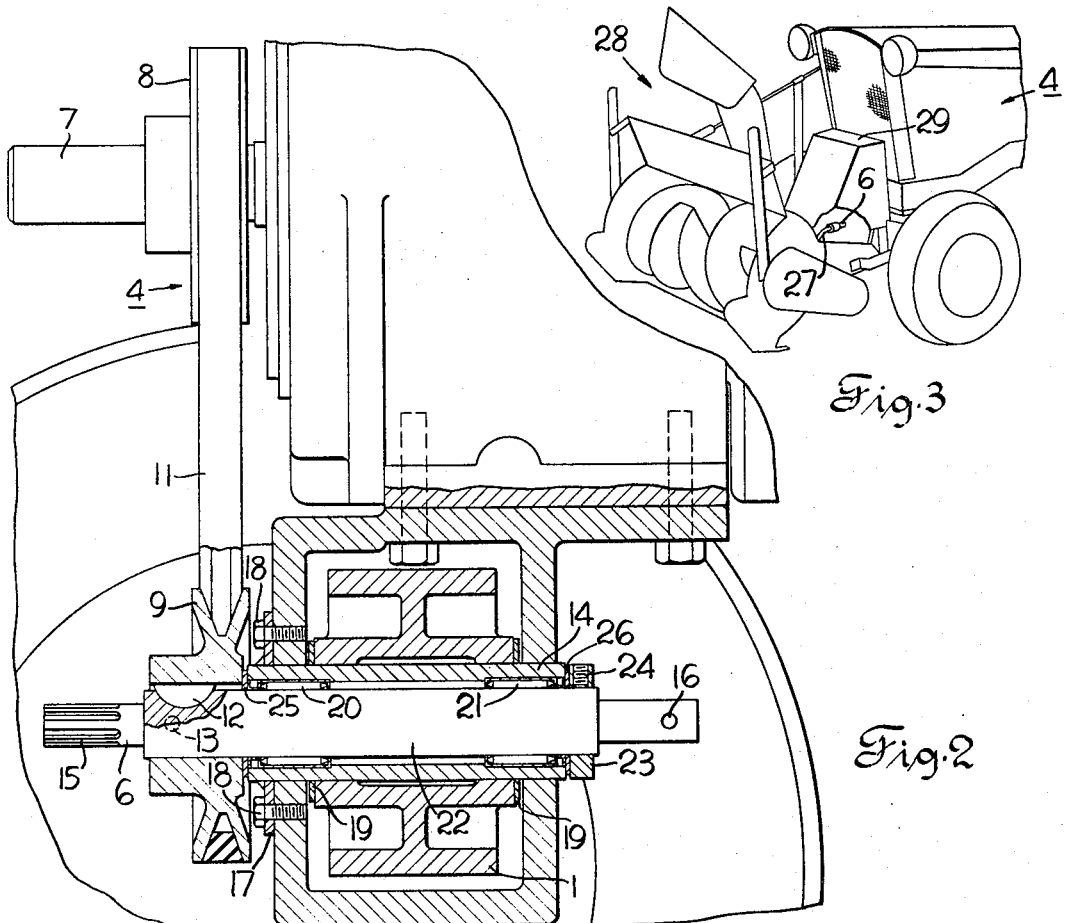
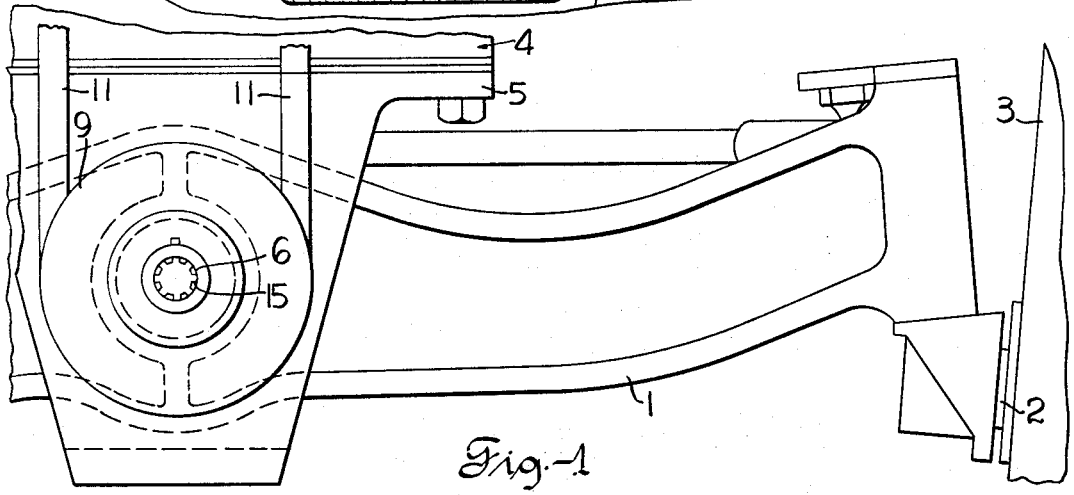
Inventor
Lee R. Suchy
By Arthur Nelson
Attorney 3,383,927
POWER TAKEOFF SHAFT
Lee R. Suchy, Eden Prairie, Minn., assignor to Allis-Chalmers Manufacturing Company, Milwaukee, Wis.
Filed Dec. 15, 1966, Ser. No. 601,880
6 Claims. (Cl. 74—15.63)

This invention relates to a power takeoff and more particularly to a common structure forming a power takeoff bearing, and pivot for the front axle.

A power takeoff shaft for a tractor is generally positioned for convenience in connecting the tractor output to an accessory implement. Conventional power takeoffs are located on the rear end of the tractor for implements which are drawn by an attached mechanism on the rear end of the tractor. An implement may also be attached to the front end or the side of the tractor and accordingly a power takeoff to conveniently connect to these implements is needed. Accordingly, this invention provides a power takeoff shaft adapted for connection to an implement on the forward or the side position on the tractor. The power takeoff shaft is mounted in the pivot bearing of the front axle and saves precious space in the design of the tractor.

It is an object of this invention to provide a power takeoff shaft mounted in the pivotal front axle bearing.

It is another object of this invention to provide a common axis of rotation for the power takeoff shaft and pivotal bearing for the front axle.

It is a further object of this invention to provide a sleeve mounted in a tractor supporting bracket and the front axle for pivotally supporting the tractor and rotatably supporting internally a power takeoff shaft.

The objects of this invention are accomplished by providing openings in a bracket supporting the front end of the tractor and the center of the front axle to receive a sleeve to form the pivotal bearing for the front axle. Internally of this sleeve on a common axis a power driven power takeoff shaft is rotatably mounted. Means are provided to drive a takeoff shaft and also drive connecting ends are provided on the takeoff shaft forward and rearward of the front axle. The preferred embodiment of this invention is illustrated in the attached drawings.

FIG. 1 illustrates a front view of the power takeoff shaft and a portion of the tractor and front axle;

FIG. 2 is a fragmentary cross section view of the pivotal bearing for the front axle and a rotating bearing for the power takeoff shaft; and FIG. 3 is a three dimensional view of reduced size to illustrate a use to which this invention may be adapted.

Referring to the drawings, a front axle 1 is supported on a front wheel shaft 2 which rotatably engages the wheel 3. The front axle 1 pivotally supports the tractor 4 by means of the bracket 5. The bracket 5 extends downwardly in front and behind the axle 1. The front axle pivotally supports the bracket 5. The power takeoff shaft 6 is rotatably supported within the pivotal bearing.

FIG. 2 illustrates the tractor 4 having an engine for driving the drive shaft 7 which is connected to the sheave 8. The sheave 8 is connected to the power takeoff shaft 6 through V-belt 11 and sheave 9. The driven sheave 9 is keyed to the shaft 6 by the key 12 and locked by the screw 13.

The power takeoff shaft 6 is journalled within the sleeve 14 and extends through the front axle 1 and the bracket 5. The power takeoff shaft 6 has a spline 15 on its forward end and a hole 16 for receiving a shear pin to drivingly connect an accessory implement. A plate 17 is welded to the sleeve 14 and fastened to the bracket 5 by a plurality of bolts 18. The sleeve 14 is received within an opening of the front axle 1. The washers 19 are received on the outer periphery of the sleeve 14 and axially spaced to the front and the rear of the front axle 1 adjacent the bracket 5.

The front axle 1 is free to pivot relative to the sleeve and bracket to accommodate roughness of the ground when the vehicle is in motion.

The sleeve 14 is recessed on both ends internally to receive the roller bearing assemblies 20 and 21 on the forward and rearward ends of the sleeve 14. The roller bearing assemblies 20, 21 rotatably support the journaled portion 22 of the power takeoff shaft 6. The ring 23 is fastened by a set screw 24 on the rearward end of the journaled portion 22 of the power takeoff shaft 6. The washer 25 is positioned between the sheave 9 and the sleeve 14 and a second washer 26 is positioned rearwardly of the sleeve 14 and engaging the ring 23. The fastening of the sheave 9 to the shaft 6 and the ring 23 to the shaft 6 limit axial movement of the shaft relative to the sleeve 14.

Referring to FIG. 3 a tractor 4 provided with a power takeoff as described above is connected to a flexible shaft 27 for driving a snow blower 28. A portion of the housing 29 is cut away to illustrate the manner of connection of the power takeoff shaft 6 to the flexible shaft 27 which drives the snow blower. FIG. 3 illustrates one of the uses which the invention readily adapts itself to. However, the use of the power takeoff is not limited to the use shown but may be used for such accessory equipment as mowers, etc.

The preferred embodiment of this invention has been illustrated and described. It is understood that other embodiments of this invention may be devised which fall within the scope of the invention defined by the attached claims.

The embodiments of the invention in which an exclusive property or privilege is claimed are defined as follows:

1. A power takeoff for use on a tractor comprising, a bracket means supporting the front end of the tractor, a front axle, a sleeve pivotally connecting said front axle with said bracket means supporting the front of said tractor, a live power takeoff shaft journaled in said sleeve and having a drive end extending therefrom, means on the end of said power takeoff shaft for drivingly connecting an implement to be driven by said power takeoff shaft.

2. A power takeoff shaft as set forth in claim 1 wherein ends at said shaft extend forward and rearward at said axle and means are provided on said ends to drivingly connect an implement.

3. A power takeoff for use on a tractor as set forth in claim 2 wherein stub ends of the power takeoff shaft are constructed within either a spline connection or with means for attaching a shear pin to drivingly connect an implement.

4. A power takeoff as set forth in claim 1 wherein said sleeve is fastened to the tractor supporting bracket and the front axle pivots relative to said sleeve.

5. A power takeoff for use in the tractor as set forth in claim 1 wherein the power takeoff shaft is journaled on a pair of antifriction bearings received within said sleeve.

6. A power takeoff for use on a tractor as set forth in claim 1 wherein a drive sheave is connected to the power output from the engine on the tractor and a driven sheave is connected to the power takeoff shaft and drivingly connected by a V-belt drive.

References Cited
UNITED STATES PATENTS

| | | | |
|---|---|---|---|
| 2,564,932 | 8/1951 | Smith | 74—15.63 |
| 2,603,248 | 7/1952 | Stewart | 74—11 X |
| 2,968,188 | 1/1961 | Du Shane et al. | 74—15.66 X |
| 3,037,572 | 6/1962 | Ritter | 74—15.8 X |
| 3,349,651 | 10/1967 | Schlapman et al. | 74—15.63 |

FOREIGN PATENTS

| | | |
|---|---|---|
| 845,553 | 8/1960 | Great Britain. |

DONLEY J. STOCKING, *Primary Examiner.*

LEONARD H. GERIN, *Examiner.*